United States Patent [19]
Lindstrom

[11] Patent Number: 5,520,077
[45] Date of Patent: May 28, 1996

[54] NUMERICALLY CONTROLLED CONTOURING HEAD HAVING TRANSLATION OF AXIAL SPINDLE MOVEMENT INTO RADIAL CUTTING EDGE MOVEMENT

[76] Inventor: Conrad B. Lindstrom, 5533 Stanhope, West Bloomfield, Mich. 48322

[21] Appl. No.: 187,691

[22] Filed: Jan. 26, 1994

[51] Int. Cl.⁶ ........................................ B23B 3/26
[52] U.S. Cl. ............................... 82/1.5; 408/159
[58] Field of Search ................... 82/1.2, 1.4, 1.5; 408/153, 158, 159; 74/110

[56] References Cited

U.S. PATENT DOCUMENTS

| | | | |
|---|---|---|---|
| Re. 32,211 | 7/1986 | Jerue et al. | 82/1.2 |
| 3,656,124 | 4/1972 | McGee | 340/172.5 |
| 3,744,352 | 7/1973 | Scholl | 82/1.2 |
| 3,802,304 | 4/1974 | Rogers | 82/14 A |
| 3,840,793 | 10/1974 | Kolell et al. | 318/574 |
| 3,842,330 | 10/1974 | Kolell | 318/574 |
| 4,006,518 | 2/1977 | Rudolph et al. | 29/39 |
| 4,055,787 | 10/1977 | Beadle et al. | 318/591 |
| 4,250,775 | 2/1981 | Jerue et al. | 82/1 C |
| 4,262,336 | 4/1981 | Pritchard | 364/474 |
| 4,354,305 | 10/1982 | Plummer et al. | 29/568 |
| 4,487,275 | 1/1984 | Froehlich | 82/1.5 |
| 4,516,889 | 5/1985 | Ortlieb | 408/152 |
| 4,569,115 | 2/1986 | Unno et al. | 29/558 |
| 4,577,535 | 3/1986 | Klabunde et al. | 82/2 E |
| 4,581,808 | 4/1986 | Lawson et al. | 29/558 |
| 4,708,546 | 11/1987 | Noggle | 409/200 |
| 4,742,738 | 5/1988 | Strand | 82/1 C |
| 4,869,127 | 9/1989 | Ariyoshi | 74/675 |
| 4,884,481 | 12/1989 | Strauss | 82/1.2 |

FOREIGN PATENT DOCUMENTS

| | | | |
|---|---|---|---|
| 1324771 | 7/1987 | U.S.S.R. | 82/1.2 |

OTHER PUBLICATIONS

Kennametal/Erickson Brochure, "Ucenter NC–Controlled Facing and Boring Heads", Copyright 1984.

Giddings & Lewis Catalog, "Davis N/C Contouring Heads", DP–887–A, Copyright 1983.

DeVlieg Brochure, "New DeVlieg NC/TP Head Makes a Jigmill a Whole Lot More Than a Jigmill".

*Primary Examiner*—Maurina T. Rachuba
*Assistant Examiner*—Kenneth J. Hansen
*Attorney, Agent, or Firm*—Young & Basile

[57] ABSTRACT

A contour head apparatus for effecting a radial adjustment of a cutting edge tool is disclosed. The contouring head apparatus is adapted for use with a numerically controlled spindle and sleeve, the sleeve capable of rotation about a first axis and the spindle capable of longitudinal movement along the first axis. A housing is rotatable about the first axis when driven by the sleeve and is held longitudinally stationary with respect to the first axis. The housing has a longitudinal aperture therethrough coaxial with the first axis allowing access to an outer end of the spindle. A yoke is disposed within the housing and pivotally connected to the housing for pivotal movement between first and second end limits of travel. The yoke is connected to the spindle at a first end and has a second end driven in rotation about the pivotal connection in response to longitudinal movement of the spindle. A slide is connected to a second end of the yoke and is supported by the housing for movement radially with respect to the first axis in response to longitudinal movement of the spindle, while the housing, slide and yoke are rotated about the first axis during rotation of the sleeve. The slide supports the cutting edge tool, preferably through a tool supporting pot.

20 Claims, 6 Drawing Sheets

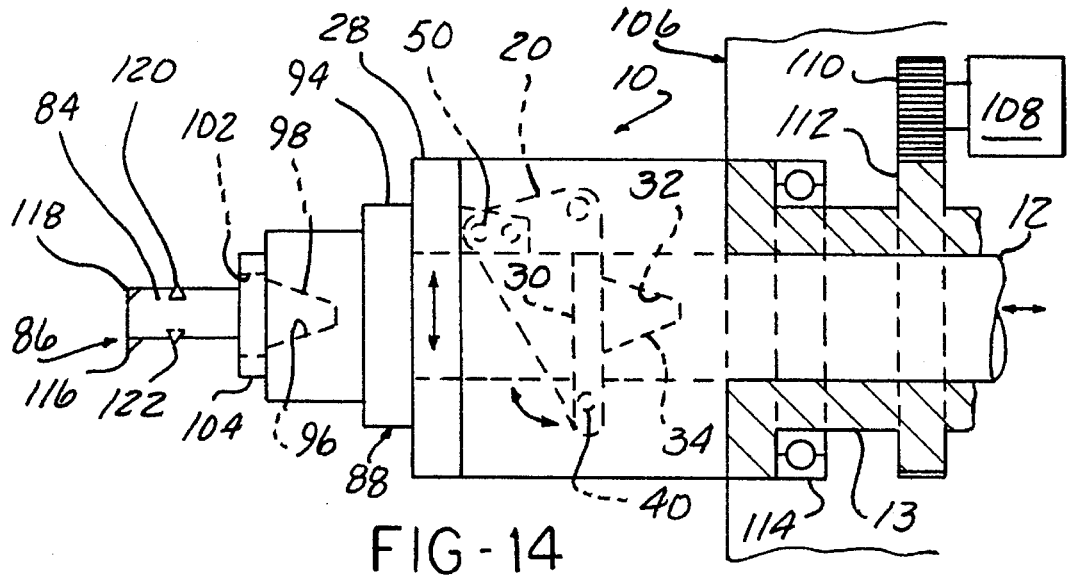
FIG-14
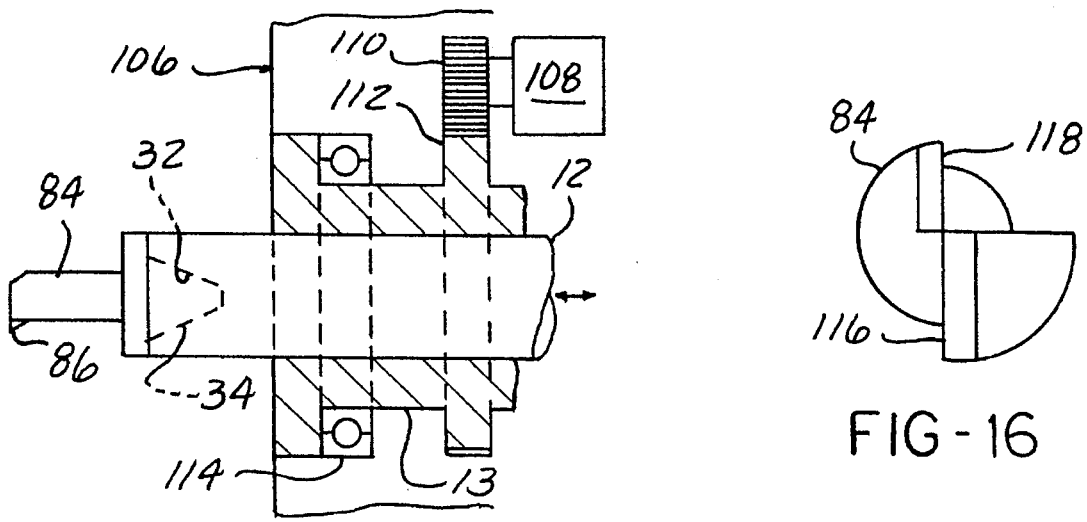
FIG-13
PRIOR ART
FIG-16
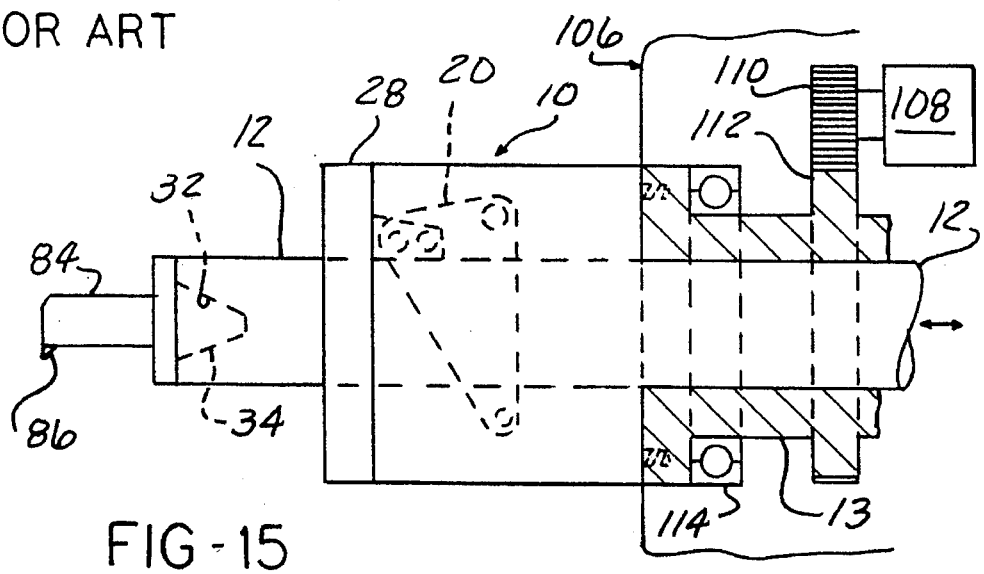
FIG-15

NUMERICALLY CONTROLLED CONTOURING HEAD HAVING TRANSLATION OF AXIAL SPINDLE MOVEMENT INTO RADIAL CUTTING EDGE MOVEMENT

FIELD OF THE INVENTION

The invention relates to numerically controlled contouring heads for boring, contouring, threading, turning, facing and other machining operations, including roughing and finishing and, in particular, to a head apparatus capable of converting axial movement of a spindle into radial movement of a cutting edge tool, while spinning.

BACKGROUND OF THE INVENTION

Machine adjustable boring bars have previously been suggested, and among the first types were ones where cutting edge tools could be interchanged as necessary to maintain a sharp cutting edge, but had only boring capabilities. Other machine adjustable boring bars have been proposed wherein a radial adjustment of the boring tool was possible, yet the tool holder was not interchangeable, i.e., it was generally a permanent part of the machine tool spindle. One of the prior known machines provided radial adjustment of the boring tool by means of a drive shaft, others suggested a longitudinally movable central rod for use in the radial adjustment of a boring tool, or an internal electric servo motor. A stylus and a contoured template were also employed for this purpose in one machine, while in another a contour cam was used in radial adjustment of a boring tool. A planetary gear has also been proposed for radial adjustment of a tool, with the input to the planetary gearing coming from the rotatable spindle.

In more recent years, many machine tools have been equipped with tool changing mechanisms to change tools from a magazine into the operating spindle. The radial adjustment of such a tool on an interchangeable tool holder has been suggested. In this case, the radial adjustment was by a longitudinally movable central rod in the machine tool spindle. Radial adjustment was also made by means of planetary gearing together with means to hold the ring gear stationary. In these latter devices, the one input to the planetary gearing was from the machine tool spindle, and only minor adjustments in radial position were established because the tool holder had a slot to establish an effective hinge portion to permit slight bending movements of the cutting tool mount.

In the past, radial adjustment of a cutting tool edge has had basically two different areas of application; first, compensating for the wear of a tool used in the manufacture of internal or external cylindrical surfaces, with the relatively small radial adjustment of the cutting edge occurring preferably when the tool is disengaged from the workpiece and, second, radial adjustment for the purpose of facing, taper turning or similar working processes, with the radial adjustment occurring during an engagement of the tool with the workpiece. It should be recognized that this list is not exhaustive and that there are other purposes for radial adjustment, however, the prior known devices sought to accomplish radial adjustment mainly for one or both of the two applications listed above.

Devices in which the tool is adjusted by adjusting, for a certain amount, an adjusting ring provided with a scale, when the work spindle is at rest are already known. In order to obtain a continuous tool adjustment during the working process, the adjusting ring is connected to a fixed point of the spindle housing through a separate linkage, so that it does not participate in the spindle rotation, such that the cross slide is adjusted independent from the spindle rotation through the transmission gear.

Numerically controlled contouring heads are also known for use with horizontal boring machines. Certain contour bores, grooves, faces, etc. can be machined without removing the workpiece from the machine, thereby eliminating additional set-ups, reducing overall cycle time, reducing inventory levels and, as a result, reducing the cost of the machining operation. Contour boring, taper boring, recessing, threading, facing, chamfering, turning and grooving are generally done on horizontal or vertical lathes. When the workpiece is too awkward to rotate, when a lathe is not available to do the work, or when milling, drilling and tapping on the same machine can avoid an extra set-up, the use of a numerically controlled contouring head on a horizontal boring machine can have significant advantages. Cross-feeding heads can be attached to the spindle sleeve of a horizontal boring machine. The typical horizontal boring machine allows for independent, parallel feeds of the spindle along a Z axis and the workpiece along a W axis. Radial motion is typically controlled by the Z axis feed motion of the spindle, providing numerically controlled radial feed on a rotating tool. The current contouring head configurations used to translate the longitudinal or axial feed of the spindle into radial feed of the rotating tool, are generally limited to boring, turning and threading. When these operations are completed the heads requires removal to do the other basic machining functions, such as milling, drilling, tapping, reaming, etc.. This head then is an attachment limited to special applications only.

SUMMARY OF THE INVENTION

The present invention is intended to be a permanent part of the machine. Whenever contouring applications are completed the tool-holding attachment or pot can be programmed to return to the center of the spindle and all standard tooling can be attached directly to the tool-holding pot attached to the contouring head of the present invention. This allows the machine to do all the other basic machining functions without removing the contouring head. Furthermore, the present invention seeks to provide a passage for the spindle through the contouring head, allowing attachment of the same tooling directly to the spindle. This then allows Z axis (spindle axis) machining to be done, when required.

Another feature of the present invention is the second cross slide pin setting which allows greater sensitivity in the radial movement of the cutting tool for high precision machining. The present invention also seeks to provide more leverage and power to increase the capability of the cutting tool to cut sideways.

The present invention provides an apparatus for effecting a radial adjustment of a cutting edge member of a rotating tool, such as a boring and turning tool. The apparatus generally includes controlled spindle means capable of longitudinal or axial movement along a first axis. Controlled rotation sleeve means sheathes the controlled spindle means and is capable of rotation about the first axis for driving the contouring head and attached tooling in rotation. Typically, the controlled spindle means would include a numerically computer controlled spindle capable of computer controlled longitudinal movement along the first axis, while the controlled rotatable sleeve means is capable of numerically controlled rotation. The contouring head apparatus of the present invention generally includes housing means rotatable with respect to the first axis and longitudinally or axially stationary with respect to the first axis. The housing means preferably includes a longitudinal aperture therethrough allowing access to an outer end of the spindle means which is positioned with the first axis coaxial with the longitudinal aperture. Yoke means is pivotally connected to the housing means. The yoke means moves pivotally between first and second angular end limits of travel about the pivot axis. The yoke means is connected to the spindle means at a first end and has a second end driven in rotation about the pivotal connection to the housing means, in response to longitudinal movement of the spindle means. Slide means is connected to the second end of the yoke means and is supported by the housing means for movement radially with respect to the first axis in response to longitudinal movement of the spindle means. The slide means supports the cutting edge tool member, preferably through an intermediate universal adapter attachment, such as a unique tool-holding pot, according to the present invention.

In one embodiment of the present invention, the apparatus of the present invention is in the form of a contouring head having housing means for connection to a controlled spindle means capable of longitudinal movement along the first axis, while the contouring head is rotated with respect to the first axis by sleeve means encasing the spindle means. The housing means is rotatable about the first axis, while being stationary in the longitudinal direction with respect to the first axis. The housing means is driven in rotation by rotation of sleeve means encasing the spindle means. The housing means is connected to the rotatable sleeve means for rotation therewith. In the present invention, the housing means is driven in rotation independently of the spindle means by the rotatable sleeve means. The spindle means provides independent actuation of the radial extension through longitudinal movement along the first axis to provide controlled movement in the radial direction of the slide means.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 13 is a simplified schematic view of a prior art numerically computer controlled horizontal boring mill with spindle means, sleeve means and a cutting edge tool;

FIG. 14 is a simplified schematic view of the contouring head apparatus of the present invention operably connected to the prior art numerically computer controlled horizontal boring mill illustrated in FIG. 13 for radial adjustment of the cutting edge tool;

FIG. 15 is a simplified schematic view of the contouring head apparatus according to the present invention operably connected to the prior art numerically computer controlled horizontal boring mill illustrated in FIG. 13 with the radial adjustment disabled and the cutting edge tool connected directly to the spindle means passing through the contouring head apparatus; and FIG. 16 is a simplified top view of a tip of a cutting edge tool according to the present invention capable of multiple cutting operations in combination with the contouring head apparatus.

DETAILED DESCRIPTION OF THE PREFERRED AND ALTERNATIVE EMBODIMENTS

Figure 1:
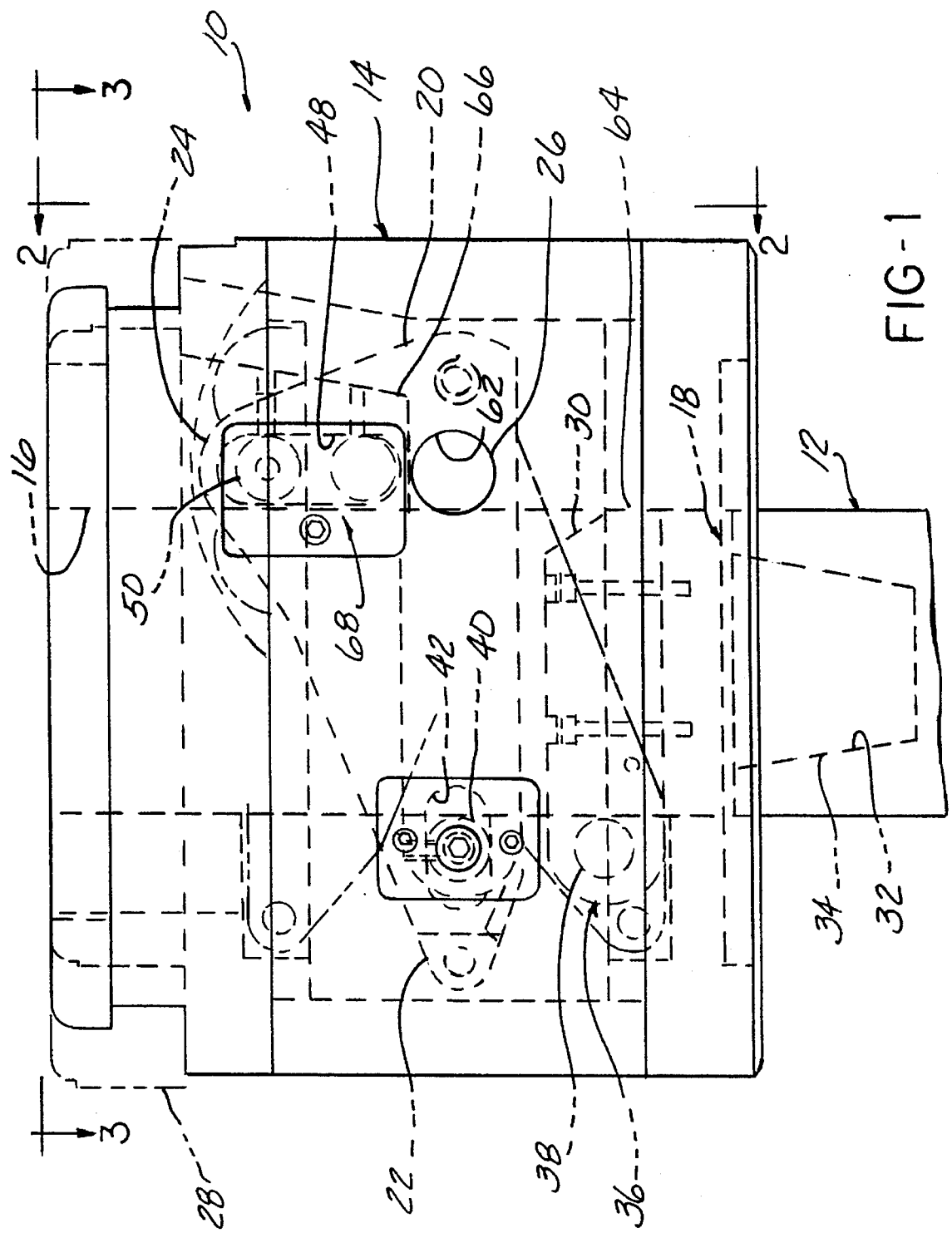
FIG. 1 is a side elevational view of the contouring head apparatus according to the present invention.
Figure 2:
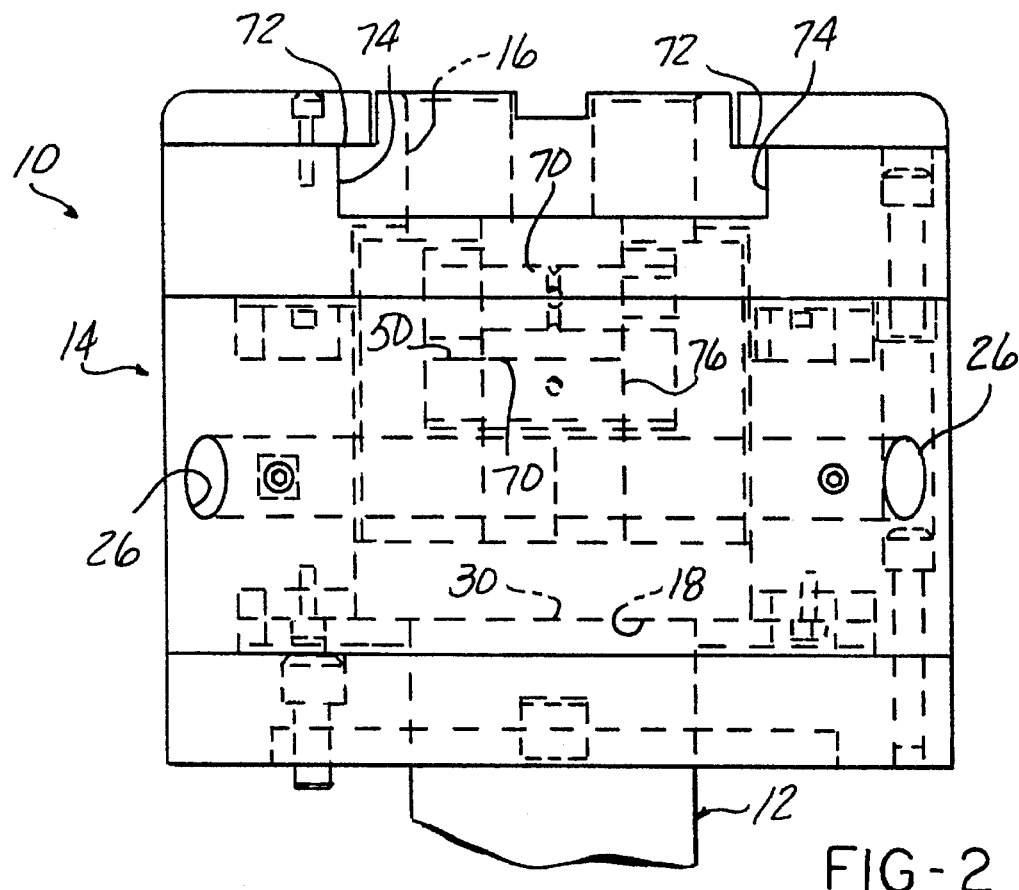
FIG. 2 is an end elevational view of the contouring head apparatus shown in FIG. 1.
Figure 3:
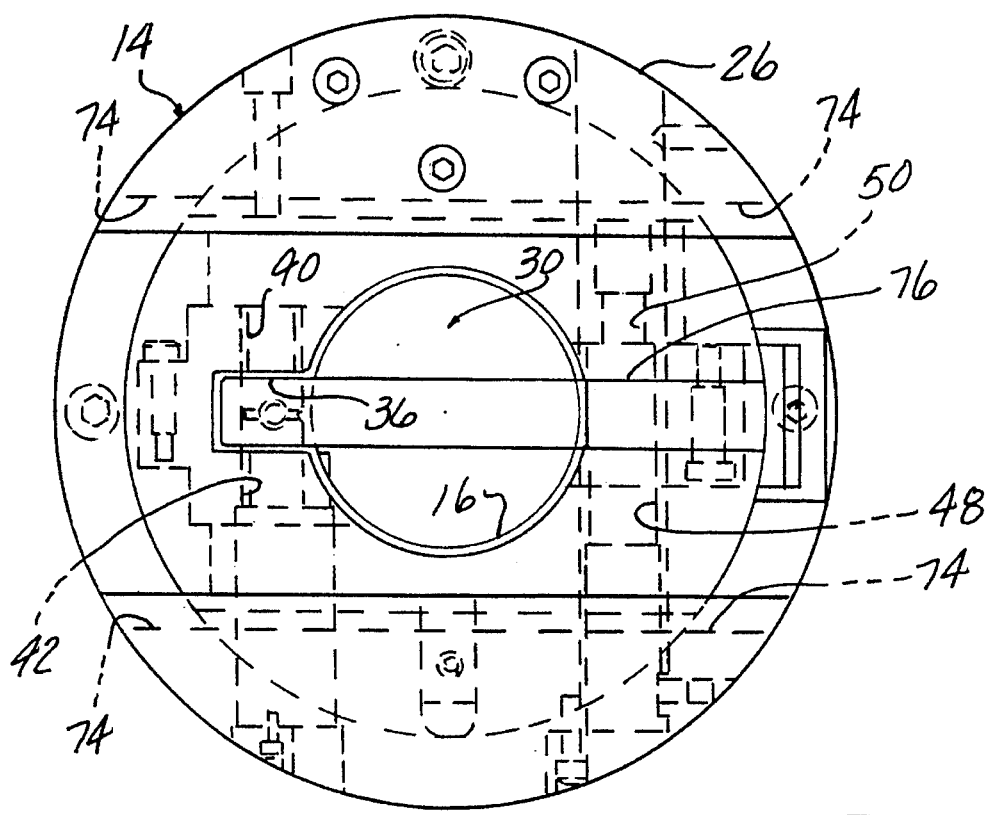
FIG. 3 is a top plan view of the contouring head apparatus shown in FIG. 1.

A contouring head apparatus 10 according to the present invention for effecting a radial adjustment of a cutting edge tool is illustrated in FIGS. 1–3. Spindle means 12 is capable of longitudinal movement along a first axis and sleeve means 13 (FIGS. 13–15), sheathing the spindle means 12, is capable of rotation about the first axis. Housing means 14 is connected to the sleeve means 13 (FIGS. 13–15) for rotation about the first axis while being longitudinally or axially stationary with respect to the first axis. The housing means has a longitudinal aperture 16 therethrough allowing access to an outer end 18 of the spindle means 12. Yoke means 20 is pivotally connected to the housing means 14 for pivotal movement between first and second end limits of travel. The yoke means 20 is connected to the spindle means at a first end 22 and has a second end 24 driven in rotation about the pivotal connection 26 in response to longitudinal movement of the spindle means 12. Slide means 28 is connected to the second end 24 of the yoke means 20 and supported by the housing means 14 for radially extending and retracting movement with respect to the first axis in response to longitudinal movement of the spindle means 12. The slide means 28 supports a tool 84 (FIGS. 14–15) having a cutting edge 86 (FIGS. 14–16).

In the preferred embodiment of the present invention, the spindle means 12 is capable of axial movement along the first axis and the sleeve means 13 (FIGS. 13–15) is capable of rotation about the first axis. The rotation is transmitted through the housing means 14 and slide means 28 to provide the necessary cutting edge tool rotation. In addition, the axial or longitudinal movement of the spindle means 12 acts through the yoke means 20, while the housing means 14 is rotating about the first axis, to radially adjust the position of the slide means 28 and the corresponding cutting edge tool 84 (FIGS. 14–16) supported by the slide means 28. This adjustment can be accomplished during cutting operations. The housing means 14 is driven in rotation independently of the spindle means 12 by the sleeve means 13 (FIGS. 13–15). The spindle means 12 provides radial positioning control through axial movement.

The spindle means 12, can take the form of a drawbar, and holds an end connector 30 to attach to the yoke means 20. The drawbar or spindle means 12 can be formed with a tapered aperture 32, sometimes referred to as a pot, on the outer end 18 for receiving a tool or the end connector 30. The tapered aperture 32 provides a universal or standard size fixture for interchanging various tools on the machine and is capable of rotatably driving the tool or end connector about the center of the longitudinal end a tapered portion 34 complementary in shape with the tapered aperture 32 for self-centering engagement therein. The end connector 30 can also include at an opposite longitudinal end a radially outwardly extending portion 36. The radially, outwardly extending portion 36 has connection means 38 for engagement with the yoke means 20 to transfer longitudinal or axial movement of the spindle means 12 into pivotal movement of the yoke means 20 about the pivotal connection 26. In its simplest form, the connection means 38 can include a pin and slot combination for interconnecting the end connector 30 to the yoke means 20. In the illustrated embodiment, the connection means can include at least one first pin 40 extending outwardly and generally normal to the radially outwardly extending portion 36 of the end connector 30 for engagement within at least one first slot 42 formed in the yoke means 20.

Figure 4:
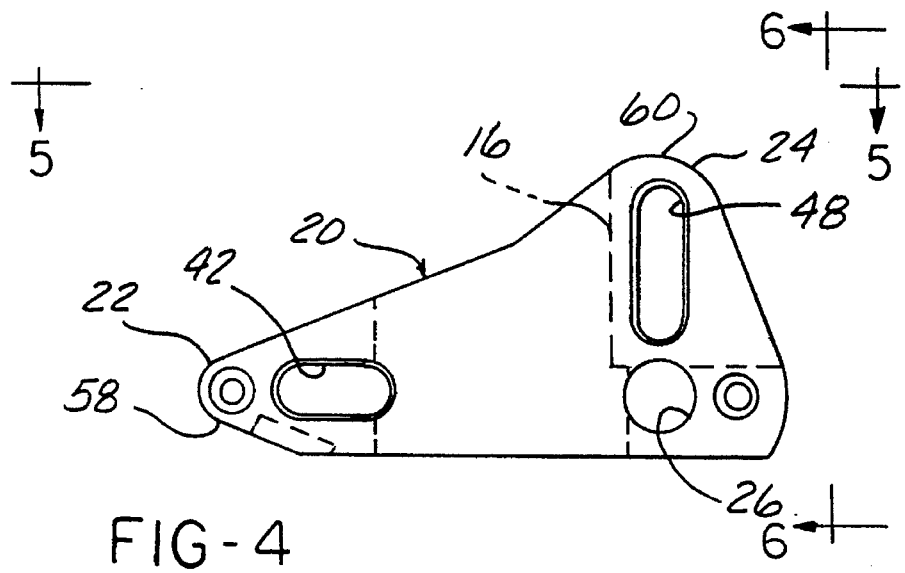
FIG. 4 is a side elevational view of the yoke means according to the present invention and as illustrated in hidden lines in FIG. 1.
Figure 5:
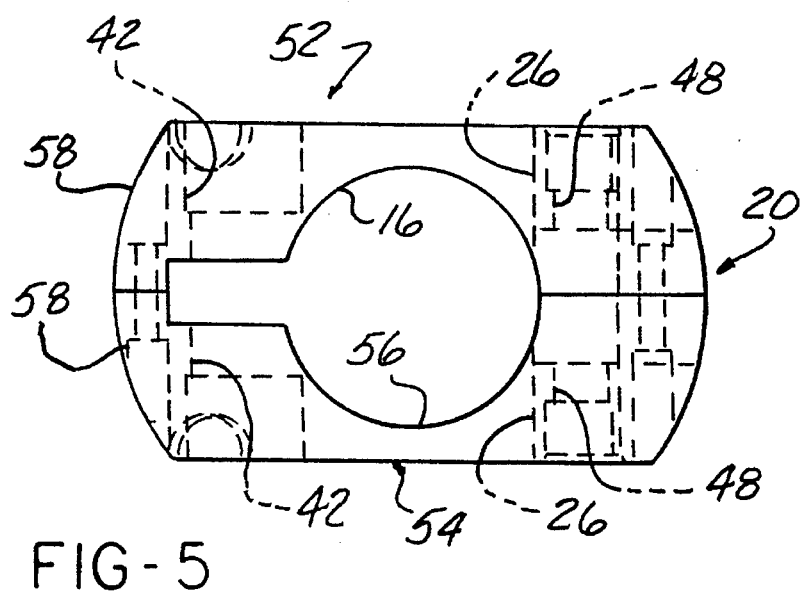
FIG. 5 is a top plan view of the yoke means illustrated in FIG. 4.
Figure 6:
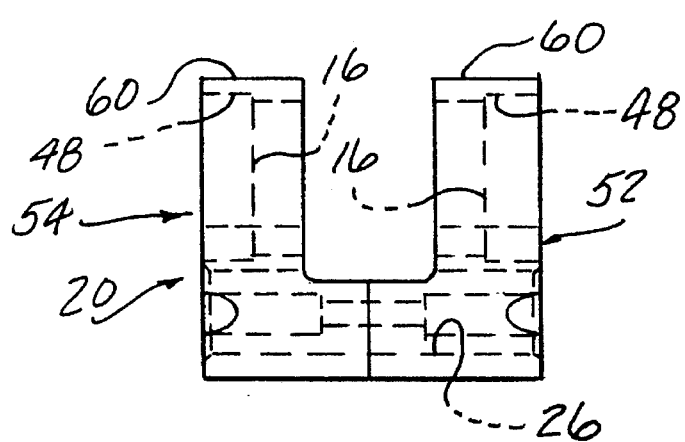
FIG. 6 is an end view of the yoke means illustrated in FIG. 4.

Referring now to FIGS. 4–6, the yoke means 20 includes a first end 22 having at least one first slot 42 formed therein for receiving at least one first pin 40 connected to the spindle means 12 by end connector 30. A second end 24 of the yoke means 20 includes at least one second slot formed therein for receiving at least one second pin connected to the slide means 28. The first slot 42 generally extends from the first end of the yoke means 20 toward the pivotal connection 26 to the housing means 14. The second slot 48 generally extends from the second end 24 of the yoke means 20 toward the pivotal connection 26 to the housing means 14. In the preferred configuration, the yoke means 20 can include a split yoke assembly having a first yoke portion 52 and a second yoke portion 54. The first and second yoke portions 52 and 54 respectively, defining a cylindrical aperture 56 when connected to one another. The cylindrical aperture 56 allowing access to the outer end 18 of the spindle means 12, and allowing passage of the spindle means 12 through the cylindrical aperture 56. In most instances, the contouring head apparatus 10 can remain mounted on the contouring machine, while other tools are mounted directly to the tapered aperture 32 of the spindle means 12 or of the tool holding pot 88. Each of the first and second yoke portions, 54 and 56, has a first arm 58 extending generally perpendicular to the first axis and offset radially therefrom and a second arm 60 extending generally longitudinally parallel with respect to the first axis and offset therefrom. Pivot means 62 connects the first and second yoke portions, 54 and 56 respectively, to the housing means 14 to form the pivotal connection 26 on a common axis between the first and second arms, 58 and 60 respectively. Spindle adapter means 64, such as end connector 30, connect the spindle means 12 to the first and second split yoke portions, 52 and 54 respectively, adjacent the first end 22 of the first arm 58 spaced outwardly from the common axis of the pivotal connection 26. Slide connector means 66, such as a slot and pin combination, 48 and 50 respectively, connects the slide means 28 to the first and second split yoke portions, 52 and 54 respectively, adjacent a second end 24 of the second arm 60 spaced outwardly from the common axis of the pivotal connection 26.

The slide connector means 66 may include adjustable means 68 for connecting the slide means 28 to the yoke means 20 to change a ratio of longitudinal movement of the spindle means 12 with respect to radial movement of the slide means 28. Preferably, the adjustable means 68 provides adjustment of the ratio in a range between a 2 to 1 and 4 to 1 ratio, inclusive, where the ratio is expressed as longitudinal movement with respect to radial movement. The adjustable means 68 may include pin means, such as second pin 50, connectable to one of a plurality of pin receiving apertures 70 formed in the slide means 28. The pin means, such as second pin 50, being driven by engagement with the yoke means 20, such as through second slot 48. In the preferred embodiment of the invention, illustrated in FIGS. 7–9, the slide means 28 includes at least two apertures 70a and 70b formed in the slide means 28 for engagement through a second pin 50 with a second slot 48 formed in the yoke means 20 (FIGS. 4–6). The pin means providing a 2 to 1 ratio of longitudinal movement to radial movement when the second pin 50 is placed in one of the apertures 70a, and providing a 4 to 1 ratio of longitudinal movement to radial movement when the second pin 50 is disposed in the other pin receiving aperture 70b. Preferably, the first and second yoke portions, 52 and 54, each includes a first slot 42 and a second slot 48 for respectively receiving a first pin 40 and a second pin 50.

It is desirable in the present invention to provide more leverage and power through the structure than previously possible in prior known devices to thereby increase the capability of the cutting edge tool to cut sideways in a manner more effective than milling, when the appropriate tools are applied. Movement of the second pin 50 between the various pin receiving apertures, 70a and 70b, can provide greater sensitivity of movement in the radial direction by shortening the distance between the pivotal connection 26 and the point of driving contact between the second pin 50 and the second slot 48. It has been found that a 4 to 1 ratio allows adjustment in the tenths of thousands of an inch. This has been found to provide a degree of accuracy and precision for a boring mill or machining center heretofore unattainable. This high degree of accuracy can only be found on very special equipment built for "finish only" types of metal cutting. Therefore, this additional capability will allow a standard machine to perform high precision finishing operations when required. In addition, the present structure enhances and extends the machining capabilities of the boring mill to include X-Y movement during machining operations, such as milling, grooving or back facing. The present invention is currently used with a boring mill, which is generally available from numerous manufacturers and is widely used through the world. In contrast, a boring machine is a type of special equipment built for "finish only" types of metal cutting and is only available from a few sources. The boring machine suffers from the disadvantages of high cost and lack of versatility. It is anticipated that the present invention can be adapted for use with a machining center, even though current machining centers lack the computer controlled spindle. It is anticipated that a controlled shaft could be provided for the machining center as a part of the contouring head of the present invention. It is believed that the controlled shaft can be positioned either on center, or off center, with respect to the axis of rotation for the machining center.

Figure 7:
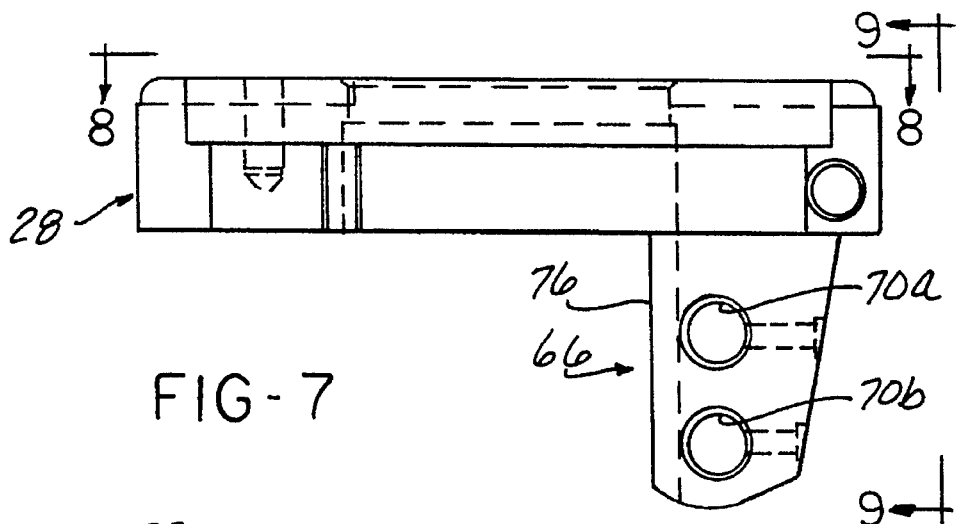
FIG. 7 is a side elevational of the slide means according to the present invention and as illustrated in hidden lines in FIG. 1.
Figure 8:
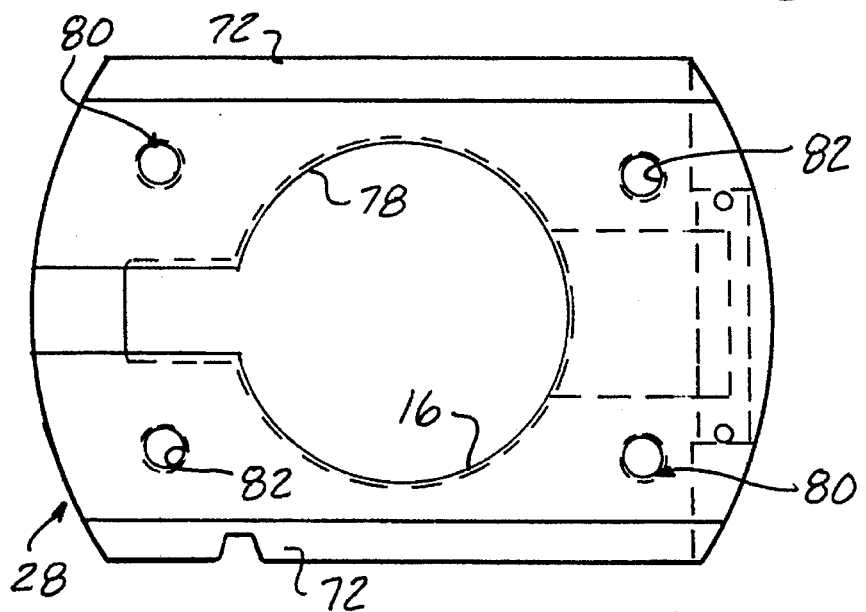
FIG. 8 is a top plan view of the slide means illustrated in FIG. 7.
Figure 9:
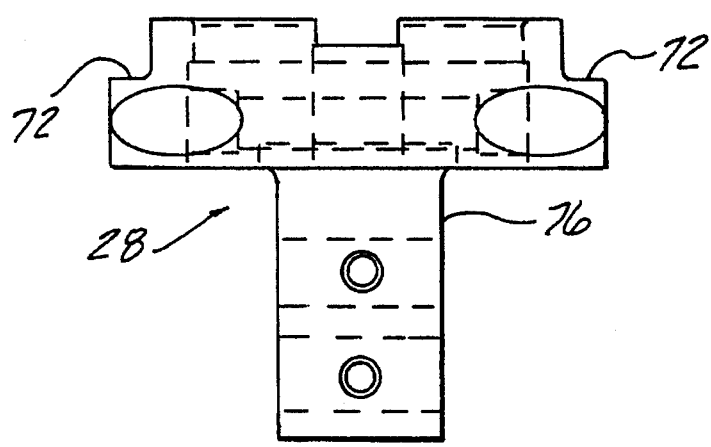
FIG. 9 is an end elevational view of the slide means illustrated in FIG. 7.

In FIGS. 7–9, the slide means 28 includes a shoulder portion 72 on either side which allows for sliding movement in the radial direction (X-axis) within slot 74 (FIG. 2 and FIG. 3) of the housing means 14, while being held captive in the longitudinal or axial direction with respect to the first axis (Z-axis). The slide means 28 may further include a longitudinally extending portion 76 having at least one pin-receiving aperture 70 formed adjacent an outer end thereof. As previously described, the longitudinally extending portion 76 preferably includes at least two pin-receiving apertures therethrough, 70*a* and 70*b* for adjusting the sensitivity of radial movement with respect to longitudinal movement of the spindle means 12. Second pin means are engageable through a selected one of the pin-receiving apertures 70 for connecting the slide means 28 to the opposing slots 48 in the first and second yoke portions, 52 and 54 respectively. The second pin means transmit rotational motion of the split yoke assembly with respect to the pivotal connection 26 to radial movement of the slide means 28 with respect to the first axis in response to longitudinal movement of the spindle means 12 along the first axis, while the housing means 14, split yoke assembly, 52 and 54, and slide means 28 rotate about the first axis in response to rotation of the sleeve means 13 (FIGS. 13–15). As can best be seen in FIG. 8, a longitudinal aperture is provided through the slide means 28 to allow access to the outer end 18 of the spindle means 12, and can provide for removal of the end connector 30 and use of the spindle means 12 with another tool assembly without removal of the housing means 14, yoke means 20 or slide means 28. Means 80 are provided for mounting a tool-holding adapter or pot 88 (FIGS. 10–12) for connecting a cutting edge tool (FIGS. 13–16) to the slide means 28. The mounting means 80 may include a plurality of threaded apertures 82.

Figure 12:
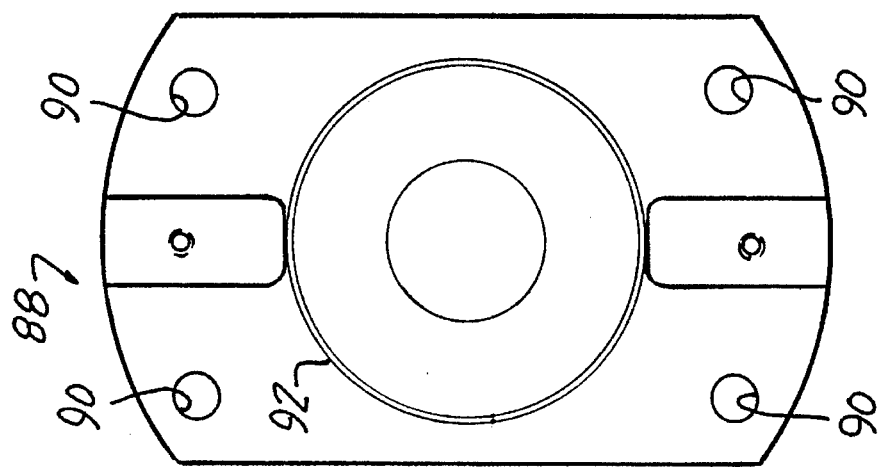
FIG. 12 is an end view of the universal tool adapter means illustrated in FIG. 10.
Figure 11:
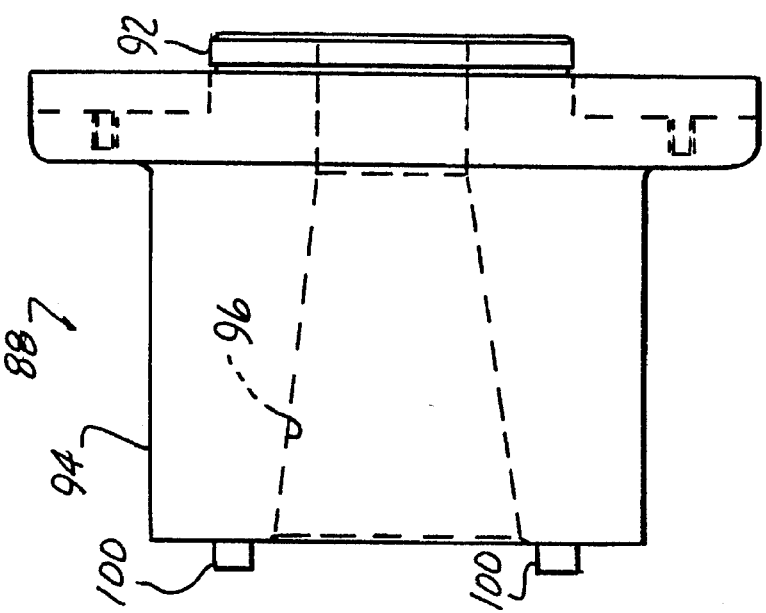
FIG. 11 is a side elevation view of the universal tool adapter means illustrated in FIG. 10.
Figure 10:
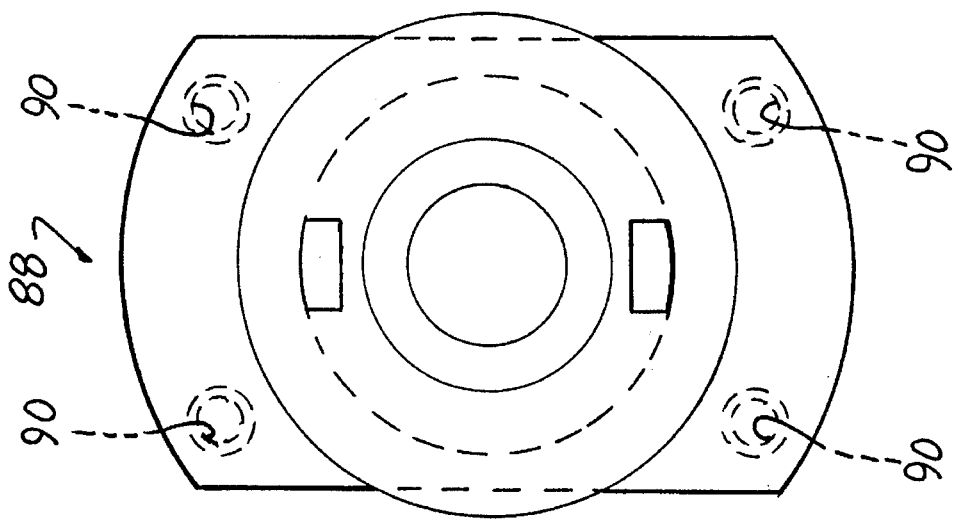
FIG. 10 is a top plan view of a universal tool adapter means according to the present invention for attachment to the slide means.

Referring now to FIGS. 10–12, a universal tool-holding adapter means 88 is depicted. The adapter means 88 includes a plurality of apertures 90 alignable with the plurality of threaded apertures 82 of the slide means 28 (FIGS. 7–9). The mounting means 80 further includes bolt means engageable through the apertures 90 for threading engagement with the threaded apertures 82 for releasably connecting the adapter means 88 to the slide means 28. The adapter means 88 also preferably includes a longitudinally extending circular shoulder 92 adapted to be received within longitudinal aperture 78 of slide means 28. Extending longitudinally outwardly from the slide means 28, the adapter means 88 further includes a tool connector 94 having a tapered aperture 96 adapted to receive a tapered end 98 (FIG. 14) of a tool 84 (FIG. 14). The tapered end 98 of the tool 84 shown in FIGS. 13–15 being of standard, universal configuration commercially available in the art. The adapter means 88 can be designed with any desired size of standard tapered aperture 96 or other connection means, such as that required for use with a 50 taper tool end. Of course, it should be recognized that other quick tool change configurations may be added to the tool connector 94 without parting from the spirit and scope of the present invention. The present invention providing a tool holder adapted to accept a plurality of standard tools for connection to a radially extending slide controlled by longitudinal movement of a computer numerically controlled spindle. The adapter means 88 of the present invention also preferably includes at least one longitudinally, outwardly extending locating or alignment projection 100 adapted to be received within an aperture or groove 102 (FIG. 14) formed in a flange fitting 104 (FIG. 14) of tool 84 (FIG. 14). The locating projection 100 provides accurate alignment of the cutting edge 86 (FIG. 14) with respect to the radial adjustment of slide means 28.

Referring now to FIGS. 13–15, a numerically controlled horizontal boring mill 106, as is known in the art, is schematically shown in simplified form with certain portions removed or shown in section for clarity. The horizontal boring mill 106 includes spindle means 12 capable of longitudinal movement along a first axis and sleeve means 13, sheathing the spindle means 12, and capable of rotation about the first axis. The sleeve means 13 driven in rotation by motor means 108 acting through a drive gear 110 and a driven gear 112 connected to or formed on a radially outwardly extending flange portion of the sleeve means 13. The sleeve means 13 being rotatably supported by bearing means 114 for rotation about the longitudinal axis of the spindle means 12. A tool 84 having a cutting edge 86 with a standard taper adapter 34, such as a 50 taper end fitting, is adapted to be received within the tapered aperture 32 formed in the end of the spindle means 12.

Referring now specifically to FIGS. 14 and 15, where a contouring head apparatus 10 according to the present invention is illustrated being attached to the prior known horizontal boring mill 106. The contouring head apparatus 10 is connected to the sleeve means 13 for rotation therewith about the first axis. As shown in FIG. 14, the end connector 30 is connected to the end of the spindle means 12 with the tapered end 34 received within the tapered aperture 32. The end connector 30 is connected to the yoke means 20 through first pin 40. Yoke means 20 is connected to slide means 28 through second pin 50. Slide means 28 moves radially in response to longitudinal movement of the spindle means 12 acting through yoke means 20 while the contouring head assembly 10 is driven in rotation by sleeve means 13. Adapter means 88 is connected to the slide means 28 for radial movement therewith. A tool 84 having a cutting edge 86 is connected to the adapter means 88 with a tapered end 98 of the tool 84 received within a tapered aperture 96 of the tool connector 94 of the adapter means 88. The tool 84 having a flange fitting 104 with an aperture or groove 102 for receiving alignment projection 100 extending longitudinally outwardly from the tool connector 94 of the adapter means 88. Once the machining operations requiring radial movement of the tool have been completed, the slide means 28 can be manipulated by longitudinal movement of the spindle means 12 to center the adapter means 88 and attached tool 84 with respect to the longitudinal or first axis of the spindle means 12. If required, the tool 84 can be removed and interchanged with a different tool. The tool can be rotated about the first axis in this position centered on the first axis for other cutting operations. If access to the operable end of the longitudinally movable spindle means 12 is required, the spindle means 12 may be accessed by removing the adapter means 88 and removing the end connector 30 from the end of the spindle means 12. The end connector 30 is disconnected from the bell crank or yoke 20 by removal of pin 40. After removal of pin 40, the spindle 12 can be extended longitudinally outwardly through the contouring head apparatus 10 of the present invention to an exposed position extending longitudinally outwardly from the now stationary slide means 28. In this position, the end connector 30 can be removed from spindle means 12 and a cutting tool 84 with a cutting edge 86 can be directly connected to the spindle means 12 with the tapered end 34 formed on the tool 84 received within the tapered aperture 32 of the spindle means 12. Therefore, it should be apparent that the present invention provides a contouring head which can be made a permanent part of previously-known horizontal, or vertical, boring mill. The contouring head of the present invention does not have to be removed in order to use existing tooling directly connected to the spindle means 12. The attachment of the adapter means 88 to the slide means 28 adds versatility to the previously-known boring mill and more particularly allows more than just boring operations to be performed. The yoke means 20 of the present invention also provides increased power to the cutting tool 84 while also increasing sensitivity. Prior known contouring heads have only been able to provide a 2 to 1 ratio of longitudinal movement of the spindle means 12 to radial movement of the cutting tool 84. The contouring head 10 according to the present invention provides the standard 2 to 1 ratio of longitudinal movement of the spindle means 12 with respect to radial movement of the cutting tool 84, and also provides a 4 to 1 ratio of longitudinal movement of the spindle means 12 to the radial movement of the cutting tool 84 to provide a high precision tool previously unavailable on a boring mill. Many operations previously requiring specialty equipment machining operations can now be done with a boring mill with the contouring head of the present invention. The contouring head of the present invention greatly increases the versatility of standard tools, and eliminates, or at the very least reduces, the need to change tools as frequently as has been experienced in the past. The contouring head 10 of the present invention would allow counter-boring with the same diameter tool 84 by merely offsetting the tool 84 from the center of the longitudinal axis of the spindle means 12. In addition, specially designed cutting tools may be provided to further enhance and take advantage of the capabilities of the contouring head 10 according to the present invention.

Referring now specifically to FIG. 16, an end of a cutting tool 84 is shown. The cutting tool 84 of this configuration has at least two cutting edges, a first edge 116 and a second edge 118. The first and second cutting edges, 116 and 118, may be formed on separate cutting inserts which can be releasably attached in pockets on the cutting tool 84 as is conventional in the art. In addition, the cutting inserts may be rotatable to expose additional cutting edges in operable position with respect to the workpiece when the first exposed cutting edge becomes dull from use. In this configuration, each of the cutting edges has a different maximum radial distance from the centerline of the cutting tool 84. With the contouring head assembly 10 of the present invention, the first and second cutting edges can then be used independently of one another. For example, if the cutting edges are aligned in parallel with the radial movement of the slide means 28, the slide means 28 can be moved by longitudinal movement of the spindle means 12 in order to engage the first cutting edge 116 having the greater radial distance with the workpiece first, to provide rough cutting operations while protecting the second cutting edge 118 from engagement with the workpiece. Upon finishing the rough cutting operations with the cutting edge 116, the slide means 28 can be radially moved in the opposite direction through the centerline of the first axis to engage the second cutting edge having the smaller radial dimension with the workpiece to provide a new, unused cutting edge for finish cutting operations on the workpiece without changing the tooling.

In addition, or alternatively, a third cutting edge 120 (FIG. 14) may be provided on a third removable and/or rotatable cutting insert as is conventional in the art. The third cutting edge 120 can be disposed at a third radial distance with respect to the longitudinal centerline of the cutting tool 84. After cutting operations with edges 116 and/or 118 are complete, the tool 84 can be positioned so that the cutting edge 120 can be brought into play by longitudinal movement of the slide means 28 with respect to the first axis, such that the first and second cutting edges are not engaged with the workpiece. The cutting edge 120 may be adapted to provide back facing operations, or grooving operations for snap rings or the like. In addition, or alternatively, a fourth cutting edge 122 can be positioned opposite from the cutting edge 120 to provide an alternative groove or snap ring contour or profile depending on the direction in which the slide means 28 is driven. For example, cutting edge 120 may form a groove with square or sharp angled corners in profile, while cutting edge 122 may offer a groove profile with curved or semi-circular peripheral edges.

It should be recognized therefore, that the contouring head assembly 10 according to the present invention provides increased versatility to the previously-known boring mills, and allows the previously-known boring mills to accomplish and perform machining operations previously unattainable, except through use of specialty equipment for "finishing only" types of metal cutting. It should be recognized that although the invention has been described in connection with a horizontal boring mill, this description has been for illustration purposes and the present invention is not to be limited to this environment. It is anticipated that the present invention can be used with a vertical boring mill or at any other possible angular orientation. The terms horizontal and vertical are used herein for reference and are not to be considered as limiting the scope of the invention disclosed herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for effecting a radial adjustment of a tool having a cutting edge in response to longitudinal movement of a numerically controlled spindle means along a first axis comprising:

housing means rotatable about said first axis and longitudinally stationary with respect to said first axis, said housing means having a longitudinal aperture extending completely therethrough allowing passage of said spindle means through said housing means;

yoke means disposed within said housing means and pivotally connected to said housing means along a second axis for pivoting movement between first and second end limits of travel, said yoke means connectible to said spindle means at a first end and having a second end driven in rotation about said second axis in response to longitudinal movement of said spindle means, said yoke means having a longitudinal aperture extending completely therethrough allowing passage of said spindle means through said yoke means when said spindle means is disconnected from said yoke means; and slide means connected to said second end of said yoke means and supported by said housing means for radial movement in a plane perpendicular with respect to said first axis in response to longitudinal movement of said spindle means when said spindle means is connected to said yoke means, said slide means having a longitudinal aperture extending completely therethrough allowing passage of said spindle means through said slide means when said spindle means is disconnected from said yoke means, said slide means capable of supporting said tool having said cutting edge.

2. The apparatus of claim 1 wherein said slide means further comprises:

adjustable connection means for connecting said slide means to said yoke means such that a ratio of longitudinal movement of said spindle means with respect to corresponding radial movement of said slide means is adjustable.

3. An apparatus for effecting a radial adjustment of a tool having a cutting edge in response to longitudinal movement of a numerically controlled spindle means along a first axis comprising:

housing means rotatable about said first axis and longitudinally stationary with respect to said first axis;

yoke means disposed within said housing means and pivotally connected to said housing means along a second axis for pivoting movement between first and second end limits of travel, said yoke means connectible to said spindle means at a first end and having a second end driven in rotation about said second axis in response to longitudinal movement of said spindle means, wherein said yoke means includes said first end of said yoke means having a first slot formed therein, first pin means connectible to said spindle means and extending through said first slot for drivingly connecting said spindle means to said yoke means, said second end of said yoke means having a second slot formed therein, and second pin means connected to said slide means and extending through said second slot for drivingly connecting said yoke means to said slide means; and slide means connected to said second end of said yoke means and supported by said housing means for radial movement with respect to said first axis in response to longitudinal movement of said spindle means, said slide means capable of supporting said tool having said cutting edge.

4. The apparatus of claim 3 wherein said first slot extends from adjacent said first end toward said second axis and said second slot extends from adjacent said second end toward said second axis.

5. An apparatus for effecting a radial adjustment of a tool having a cutting edge in response to longitudinal movement of a numerically controlled spindle means along a first axis comprising:

housing means rotatable about said first axis and longitudinally stationary with respect to said first axis;

yoke means disposed within said housing means and pivotally connected to said housing means along a second axis for pivoting movement between first and second end limits of travel, said yoke means connectible to said spindle means at a first end and having a second end driven in rotation about said second axis in response to longitudinal movement of said spindle means, wherein said yoke means further includes a split yoke assembly having a first yoke portion and a second yoke portion, said first and second yoke portions defining a cylindrical aperture when connected to one another for allowing access to an outer end of said spindle means, each of said first and second yoke portions having a first arm extending generally perpendicular to said first axis and spaced therefrom, and a second arm extending generally longitudinally with respect to said first axis and spaced therefrom, said first and second arms extending outwardly from said second axis, pivot means for connecting said first and second yoke portions to said housing means along said second axis, spindle adapter means for selectively connecting said spindle means to said split yoke assembly adjacent said first end opposite from said second axis, and slide connector means for connecting said slide means to said split yoke assembly adjacent said second end opposite from said second axis; and slide means connected to said second end of said yoke means and supported by said housing means for radial movement with respect to said first axis in response to longitudinal movement of said spindle means, said slide means capable of supporting said tool having said cutting edge.

6. The apparatus of claim 5 wherein said spindle adapter means further comprises:

an adapter connectible to said spindle means, said adapter having a radially extending portion with an aperture adjacent an outer end; and first pin means for connecting said adapter to said split yoke assembly, said first pin means for transmitting longitudinal movement of said spindle means to rotational motion of said split yoke assembly about said second axis.

7. The apparatus of claim 6 wherein said slide connector means further comprises:

a longitudinally extending portion on said slide means having an aperture adjacent an outer end; and second pin means for connecting said slide means to said split yoke assembly, said second pin means for transmitting rotational motion of said split yoke assembly about said second axis to radial movement of said slide means with respect to said first axis in response to longitudinal movement of said spindle means, while allowing said housing means, split yoke assembly and slide means to rotate about said first axis.

8. An apparatus for effecting a radial adjustment of a tool having a cutting edge in response to longitudinal movement of a numerically controlled spindle means along a first axis comprising:

housing means rotatable about said first axis and longitudinally stationary with respect to said first axis, said housing means having a longitudinal aperture extending completely therethrough allowing passage of said spindle means through said housing means;

yoke means disposed within said housing means and pivotally connected to said housing means along a second axis for pivoting movement between first and second end limits of travel, said yoke means connectible to said spindle means at a first end and having a second end driven in rotation about said second axis in response to longitudinal movement of said spindle means;.

slide means connected to said second end of said yoke means and supported by said housing means for radial movement with respect to said first axis in response to longitudinal movement of said spindle means, said slide means capable of supporting said tool having said cutting edge; and adjustable connection means for connecting said slide means to said yoke means such that a ratio of longitudinal movement of said spindle means with respect to corresponding radial movement of said slide means is adjustable, wherein said adjustable connection means includes said slide means having a plurality of pin-receiving apertures, and pin means connectible to one of said plurality of pin-receiving apertures in said slide means for driving engagement by said yoke means while moving between said first and second end limits of travel, wherein a first distance is defined between said yoke means connection to said spindle means and said second axis, and a second distance is defined between said pin means and said second axis such that said ratio of said first distance to said second distance is adjustable by selecting one of said plurality of pin-receiving apertures in said slide means for placement of said pin means to change a radial sensitivity of said slide means with respect to longitudinal movement of said spindle means.

9. The apparatus of claim 8 wherein said ratio is in a range between 2 to 1 and 4 to 1 inclusive.

10. An apparatus for effecting a radial adjustment of a tool having a cutting edge in response to longitudinal movement of a numerically controlled spindle means along a first axis comprising:

housing means rotatable about said first axis and longitudinally stationary with respect to said first axis;

yoke means disposed within said housing means and pivotally connected to said housing means along a second axis for pivoting movement between first and second end limits of travel, said yoke means connectible to said spindle means at a first end and having a second end driven in rotation about said second axis in response to longitudinal movement of said spindle means;

slide means connected to said second end of said yoke means and supported by said housing means for radial movement with respect to said first axis in response to longitudinal movement of said spindle means, said slide means capable of supporting said tool having said cutting edge, said slide means having a plurality of pin-receiving apertures; and adjustable connection means for connecting said slide means to said yoke means such that a ratio of longitudinal movement of said spindle means with respect to corresponding radial movement of said slide means is adjustable, wherein said adjustable connection means further includes adjustable pin means selectively connectible to one of said plurality of pin-receiving apertures in said slide means for driving engagement by said yoke means while moving between said first and second end limits of travel, wherein a first distance is defined between said yoke means connection to said spindle means and said second axis, and a second distance is defined between said pin means and said second axis, such that said ratio of said first distance to said second distance is adjustable by selecting one of said plurality of pin-receiving apertures in said slide means for placement of said adjustable pin means to change a radial sensitivity of said slide means with respect to longitudinal movement of said spindle means.

11. The apparatus of claim 10 wherein said ratio is in a range between 2 to 1 and 4 to 1 inclusive.

12. The apparatus of claim 10 wherein said yoke means further comprises:

said first end of said yoke means having a first slot formed therein;

first pin means connectible to said spindle means and extending through said first slot for drivingly connecting said spindle means to said yoke means;

said second end of said yoke means having a second slot formed therein; and second pin means connected to said slide means and extending through said second slot for drivingly connecting said yoke means to said slide means.

13. The apparatus of claim 12 wherein said first slot extends from adjacent said first end toward said second axis and said second slot extends from adjacent said second end toward said second axis.

14. The apparatus of claim 10 wherein said yoke means further comprises:

a split yoke assembly having a first yoke portion and a second yoke portion, said first and second yoke portions defining a cylindrical aperture when connected to one another for allowing access to an outer end of said spindle means, each of said first and second yoke portions having a first arm extending generally perpendicular to said first axis and spaced therefrom, and a second arm extending generally longitudinally with respect to said first axis and spaced therefrom, said first and second arms extending outwardly from said second axis;

pivot means for connecting said first and second yoke portions to said housing means along said second axis;

spindle adapter means for selectively connecting said spindle means to said split yoke assembly adjacent said first end opposite from said second axis; and slide connector means for connecting said slide means to said split yoke assembly adjacent said second end opposite from said second axis.

15. The apparatus of claim 10 further comprising:

an adapter connectible to said spindle means, said adapter having a radially extending portion with an aperture adjacent an outer end; and first pin means for connecting said adapter to said yoke means, said first pin means for transmitting longitudinal movement of said spindle means to rotational motion of said yoke means about said second axis.

16. The apparatus of claim 10 further comprising:

said slide means having a longitudinally extending portion projecting toward said spindle means and having an aperture adjacent an outer end; and second pin means for connecting said slide means to said yoke means, said second pin means for transmitting rotational motion of said yoke means about said second axis to radial movement of said slide means with respect to said first axis in response to longitudinal movement of said spindle means, while allowing said housing means, yoke means and slide means to rotate about said first axis.

17. An apparatus for effecting a radial adjustment of a tool having a cutting edge in response to longitudinal movement of a numerically controlled spindle means along a first axis, and sleeve means sheathing said spindle means and capable of being driven in rotation about said first axis, said apparatus comprising:

a housing connected to said sleeve means for rotation about said first axis and longitudinally stationary with respect to said first axis, said housing having a longitudinal aperture therethrough allowing access to an outer end of said spindle means;

a slide connected to and supported by said housing for radial movement with respect to said first axis in response to longitudinal movement of said spindle means, said slide capable of supporting said tool having said cutting edge and having a portion extending longitudinally toward said spindle means with a plurality of pin-receiving apertures adjacent an outer end, said slide having a longitudinal aperture therethrough allowing access to said outer end of said spindle means;

a yoke disposed within said housing and pivotally connected to said housing along a second axis for pivoting movement between first and second end limits of travel, said yoke connectible to said spindle means at a first end and having a second end driven in rotation about said second axis in response to longitudinal movement of said spindle means, said first end having a first slot formed therein extending from adjacent said first end toward said second axis and said second end having a second slot formed therein extending from adjacent said second end toward said second axis, said yoke having a first yoke portion and a second yoke portion, said first and second yoke portions defining a cylindrical longitudinal aperture when connected to one another for allowing access to an outer end of said spindle means, each of said first and second yoke portions having a first arm extending generally perpendicular to said first axis and spaced therefrom, and a second arm extending generally longitudinally with respect to said first axis and spaced therefrom, said first and second arms extending generally outwardly from said second axis;

pivot means connecting said first and second yoke portions to said housing at said second axis;

a spindle adapter for selectively connecting said spindle means to said yoke adjacent an end of said first arm opposite from said second axis, said spindle adapter having a radially extending portion with an aperture adjacent an outer end, said spindle adapter removable from said spindle means through said longitudinal apertures of said housing, yoke and slide without removing said housing, yoke and slide;

first pin means for connecting said adapter to said yoke through said first slot, said first pin means for transmitting longitudinal movement of said spindle means to rotational motion of said split yoke about said second axis; and adjustable second pin means for adjustably connecting said slide to said yoke adjacent said second end opposite from said second axis, said adjustable second pin means allowing a ratio of longitudinal movement of said spindle means to corresponding radial movement of said slide to be changed such that said ratio is adjustable in a range between 2 to 1 and 4 to 1 inclusive, said adjustable second pin means connectible to one of said plurality of pin-receiving apertures in said slide for driving engagement through said second slot in said yoke while said yoke moves between said first and second end limits of travel, said adjustable second pin means for transmitting rotational motion of said yoke about said second axis to radial movement of said slide with respect to said first axis in response to longitudinal movement of said spindle means while said housing, yoke and slide rotate about said first axis.

18. In an apparatus for effecting a radial adjustment of a tool having a cutting edge in response to longitudinal movement of a numerically controlled spindle means along a first axis, the improvement comprising:

housing means rotatable about said first axis and longitudinally stationary with respect to said first axis, said housing means having a longitudinal aperture extending completely therethrough allowing passage of said spindle means through said housing means;

yoke means disposed within said housing means and pivotally connected to said housing means along a second axis for pivoting movement between first and second end limits of travel, said yoke means connectible to said spindle means at a first end and having a second end driven in rotation about said second axis in response to longitudinal movement of said spindle means, said yoke means having a longitudinal aperture extending completely therethrough allowing passage of said spindle means through said yoke means when said spindle means is disconnected from said yoke means; and slide means connected to said second end of said yoke means and supported by said housing means for radial movement in a plane perpendicular with respect to said first axis in response to longitudinal movement of said spindle means when said spindle means is connected to said yoke means, said slide means having a longitudinal aperture extending completely therethrough allowing passage of said spindle means through said slide means when said spindle means is disconnected from said yoke means, said slide means supporting said tool having said cutting edge.

19. In an apparatus for effecting a radial adjustment of a tool having a cutting edge in response to longitudinal movement of a numerically controlled spindle means along a first axis, the improvement comprising:

housing means rotatable about said first axis and longitudinally stationary with respect to said first axis, said housing means having a longitudinal aperture extending completely therethrough allowing passage of said spindle means through said housing means;

yoke means disposed within said housing means and pivotally connected to said housing means along a second axis for pivoting movement between first and second end limits of travel, said yoke means connected to said spindle means at a first end and having a second end driven in rotation about said second axis in response to longitudinal movement of said spindle means, wherein said yoke means includes a split yoke assembly having a first yoke portion and a second yoke portion, said first and second yoke portions defining a cylindrical aperture when connected to one another for allowing access to an outer end of said spindle means, each of said first and second yoke portions having a first arm extending generally perpendicular to said first axis and spaced therefrom, and a second arm extending generally longitudinally with respect to said first axis and spaced therefrom, said first and second arms extending outwardly from said second axis;

pivot means for connecting said first and second yoke portions to said housing means along said second axis;

spindle adapter means for connecting said spindle means to said split yoke assembly adjacent said first end opposite from said second axis; and slide means connected to said second end of said yoke means and supported by said housing means for radial movement with respect to said first axis in response to longitudinal movement of said spindle means, said slide means supporting said tool having said cutting edge; and slide connector means for connecting said slide means to said split yoke assembly adjacent said second end opposite from said second axis.

20. In an apparatus for effecting a radial adjustment of a tool having a cutting edge in response to longitudinal movement of a numerically controlled spindle means along a first axis, the improvement comprising:

housing means rotatable about said first axis and longitudinally stationary with respect to said first axis, said housing means having a longitudinal aperture extending completely therethrough allowing passage of said spindle means through said housing means;

yoke means disposed within said housing means and pivotally connected to said housing means along a second axis for pivoting movement between first and second end limits of travel, said yoke means connected to said spindle means at a first end and having a second end driven in rotation about said second axis in response to longitudinal movement of said spindle means, wherein said yoke means includes said first end of said yoke means having a first slot formed therein and said second end of said yoke means having a second slot formed therein;

first pin means connected to said spindle means and extending through said first slot for drivingly connecting said spindle means to said yoke means;

slide means connected to said second end of said yoke means and supported by said housing means for radial movement with respect to said first axis in response to longitudinal movement of said spindle means, said slide means supporting said tool having said cutting edge; and second pin means connected to said slide means and extending through said second slot for drivingly connecting said yoke means to said slide means.

* * * * *